United States Patent [19]
Chabanne et al.

[11] Patent Number: 5,961,088
[45] Date of Patent: Oct. 5, 1999

[54] SEAT SECURING AND ADJUSTING DEVICE

[75] Inventors: Jean-Pierre Chabanne, Champvallon; Jean Duchateau, Pont Salomon, both of France

[73] Assignee: Irausa Ingeniera, S.A., Burgos, Spain

[21] Appl. No.: 09/115,765

[22] Filed: Jul. 15, 1998

[30] Foreign Application Priority Data

Jul. 15, 1997 [FR] France .................................. 97 09198

[51] Int. Cl.⁶ .................................................. F16M 13/00
[52] U.S. Cl. .......................... 248/429; 297/311; 248/430
[58] Field of Search .................... 248/429, 430; 297/311, 473, 344.1, 345.1, 344, 346, 468, 437, 423.38, 470, 331, 344.11, 344.13, 216, 335, 340; 296/65.1, 63, 68.1; 280/801, 804, 805

[56] References Cited

U.S. PATENT DOCUMENTS

| | | | |
|---|---|---|---|
| 2,798,532 | 7/1957 | Clark ........................................ | 248/430 |
| 2,919,744 | 1/1960 | Tanaka .................................... | 248/429 |
| 3,204,916 | 9/1965 | Pickles .................................... | 248/429 |
| 3,479,099 | 11/1969 | Krause ..................................... | 248/429 |
| 3,711,057 | 1/1973 | Marx ........................................ | 248/430 |
| 3,866,876 | 2/1975 | Adams ..................................... | 248/429 |
| 4,072,347 | 2/1978 | Boisset .................................... | 248/429 |
| 4,154,122 | 5/1979 | Muhr . | |
| 4,168,051 | 9/1979 | Terada ..................................... | 248/429 |
| 4,291,856 | 9/1981 | Urai ........................................ | 248/429 |
| 4,660,795 | 4/1987 | Ikegaya et al. .......................... | 248/430 |
| 4,993,679 | 2/1991 | Urai et al. . | |
| 5,167,393 | 12/1992 | Hayakawa et al. ...................... | 248/430 |
| 5,172,882 | 12/1992 | Nini . | |
| 5,213,300 | 5/1993 | Rees ........................................ | 248/429 |
| 5,720,463 | 2/1998 | Wisnet et al. ........................... | 248/429 |

FOREIGN PATENT DOCUMENTS

| | | | |
|---|---|---|---|
| 209-615 | 1/1987 | European Pat. Off. ............... | 248/430 |
| 2 525 975 | 4/1983 | France .................................... | 248/429 |
| 2 702 717 | 9/1994 | France . | |
| 2 351 574 | 5/1974 | Germany ................................ | 248/429 |
| 2821-605 | 12/1978 | Germany ................................ | 248/429 |
| 39 28 720 A1 | 3/1991 | Germany . | |
| 39 35 359 A1 | 5/1991 | Germany . | |

*Primary Examiner*—Derek J. Berger
*Assistant Examiner*—Michael Nornberg
*Attorney, Agent, or Firm*—Oliff & Berridge, PLC

[57] ABSTRACT

A device for securing and adjusting the lengthwise position of a removable and reversible seat for a vehicle. The device includes a pair of C-shaped tracks secured to the floor of the vehicle with each track having an upper compartment and a lower compartment. The upper compartment of each track accommodates a slider that is connected to each leg of the seat of the vehicle and includes a locking device having teeth. The slider is displaceable relative to the track so that the slider can be manipulated between a locked position and an unlocked position. The lower compartment accommodates a plate having parallel rows of perforations that are engaged by the teeth of the locking device in the locked position and are released from engagement in the unlocked position. The configuration of the track and slider arrangement provide the device with a strong leg-slider connection as well as good resistance to tearing free from the floor of the vehicle in case of impact.

8 Claims, 4 Drawing Sheets

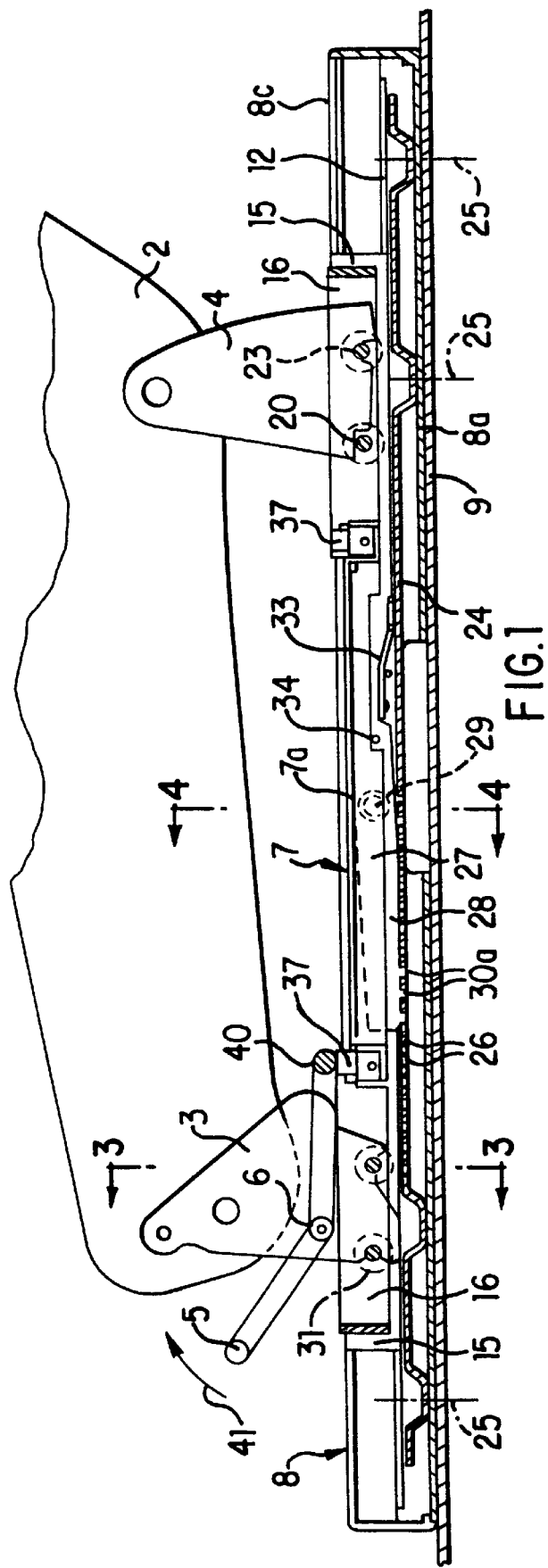
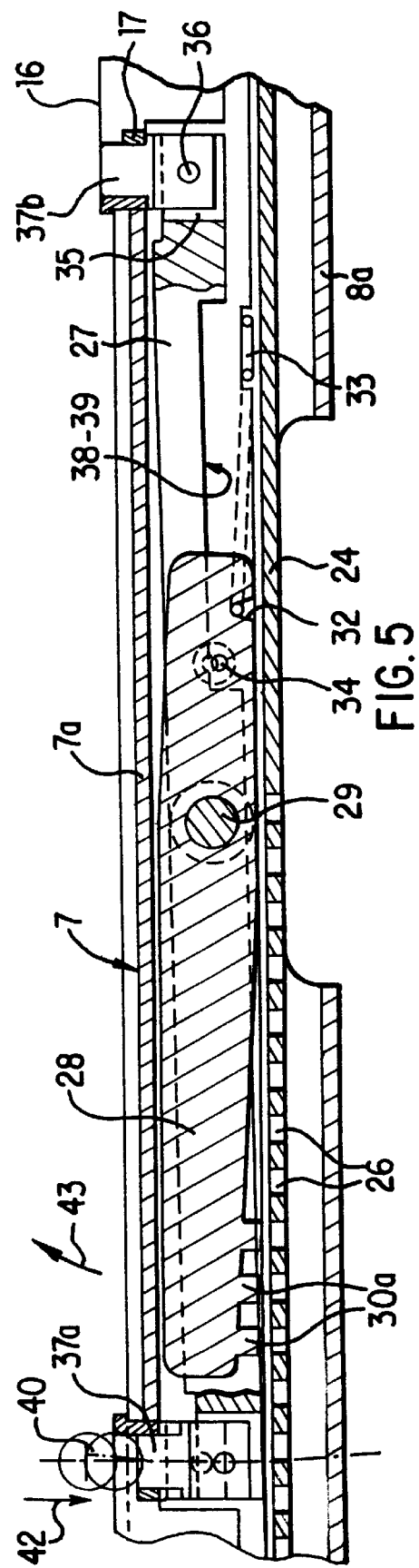

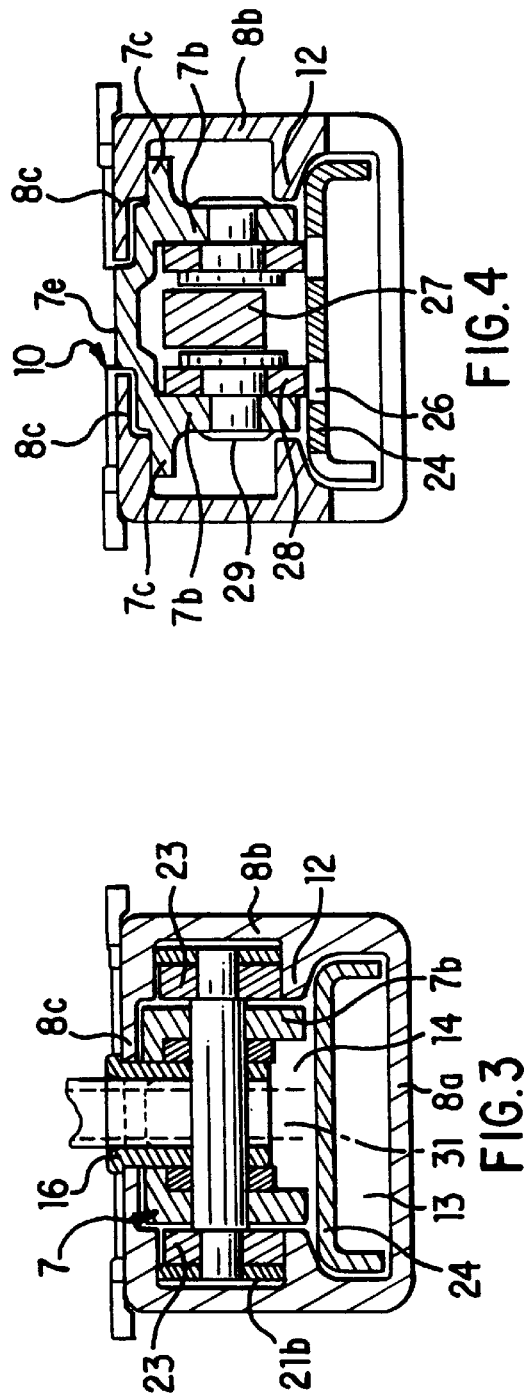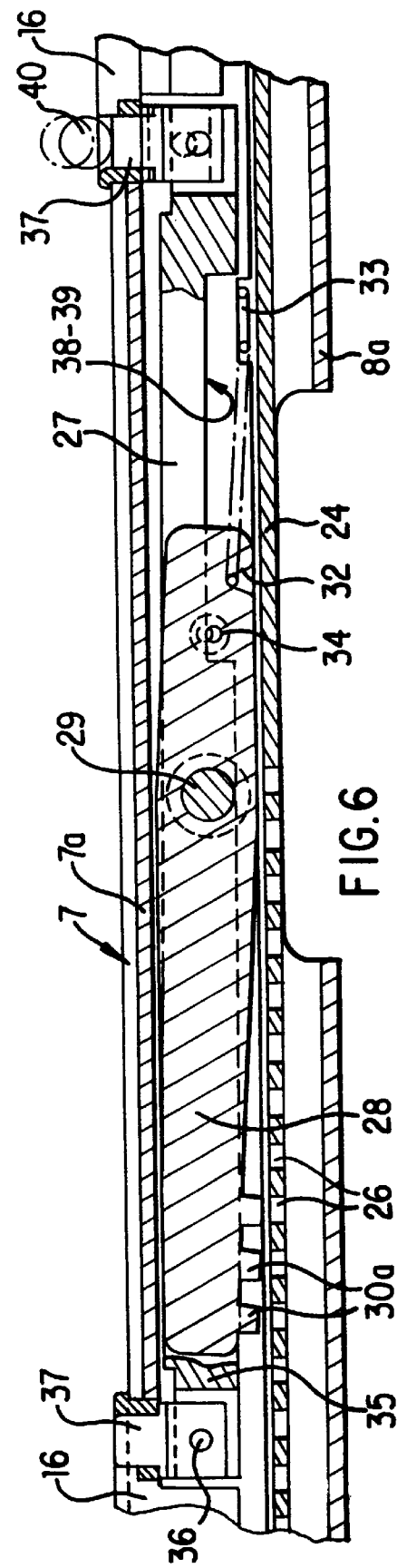

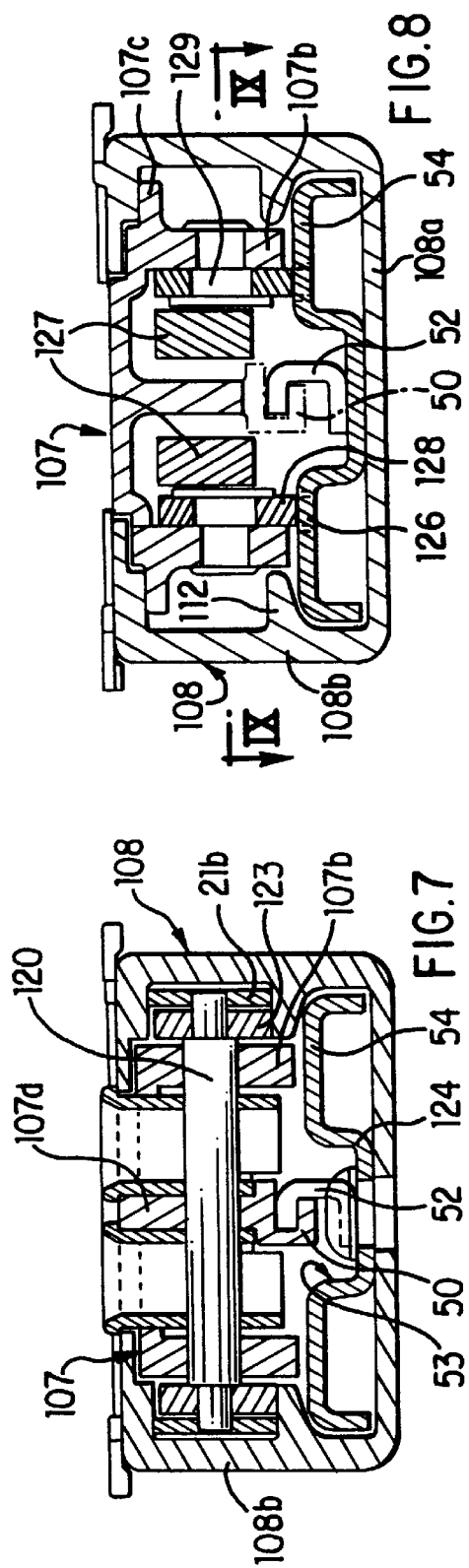
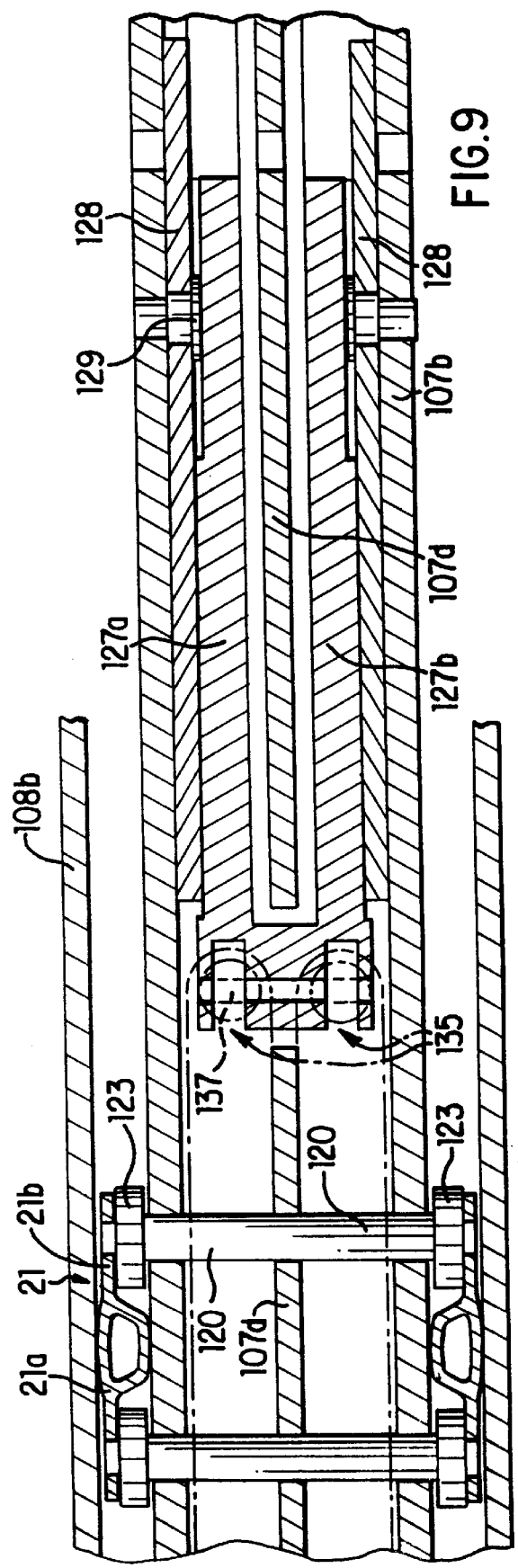

SEAT SECURING AND ADJUSTING DEVICE

BACKGROUND OF THE INVENTION

The invention relates to a device for manipulating a seat in a vehicle. More particularly, the invention relates to a device for securing and adjusting the lengthwise position of a removable and/or reversible seat in a vehicle.

Numerous devices are already known that secure and adjust the lengthwise position of a removable and/or reversible seat in a vehicle. Typically, the conventional devices have at least two parallel tracks that are attached to the vehicle floor. In addition, two sliders are displaceable relative to the parallel tracks. The devices also have fastening means cooperating with the fastening means provided on each of the four legs of the seat. Each slider is provided with locking means that cooperate with fixed recesses in the respective track for each slider. The locking means allow the device to be brought into an unlocked position, against spring return means, by a manual control mounted on the seat frame.

For example, the device disclosed in French Patent No. 2,702,717 provides tracks having a C-shaped cross section and includes sliders having a similarly shaped cross section. The device is designed to be used in minivan type vehicles in which a given seat can occupy several transverse and lengthwise positions depending on the distribution of the tracks on the floor and the sliders on the tracks.

Due to changes in legislation requiring each passenger in a vehicle to wear a seat belt, movable seats have been redesigned to better receive the points of engagement of the seat belt. The moveable seats have also been redesigned to provide better resistance to the forces that displace a passenger from the seat during impact.

Current seat securing and adjusting devices have proven to be fairly fragile and most are not strong enough to provide the required resistance. Typically, such devices have track wings that are provided with rows of perforations for the lengthwise adjustment of the seat. However, the perforations reduce the strength of the cross section of the slider, thereby reducing the reliability of the seat belt.

Practical constraints are added to the above-mentioned physical drawbacks. Since the interior of the vehicle can be occupied in different configurations, for example, with the seats facing backward, it is important for the means adjusting the lengthwise position of a seat relative to the tracks to be usable however the seat is positioned. In addition, the manual control should be disposed near the front legs, regardless of whether the seat is facing forward or backward. Moreover, it is desirable for the sliders to be easily adjustable before the seat is set in place.

Most conventional seat security and adjusting devices are not designed to accommodate these practical constraints. In addition, the devices that accommodate the practical constraints employ complex structures that increase the total weight of the device. Obviously, the increased weight of the device counteracts the efforts to decrease the overall weight of the vehicle with the purpose of improving the vehicle's gas mileage.

SUMMARY OF THE INVENTION

To overcome the shortcomings of the related art discussed above, the invention provides a seat securing and adjusting device which, while providing the necessary seat fastening strength, is lighter than the conventional devices and operable in all seat positions.

In particular, according to an aspect of the invention, each slider is made of a light-metal alloy. Each track of the device is also made of a light-metal alloy and divided by horizontal internal ribs into a lower compartment and an upper compartment. The lower compartment receives a steel plate having two parallel rows of perforations spaced lengthwise and the upper compartment accommodates a slider. Each slider has an inverted U-shaped cross section that is traversed near each end of the slider by two horizontal steel shafts. The ends of the steel shafts have wheels that roll on ribs inside the track and central parts that form hooking elements for complementary means with which each seat leg is equipped. Each leg is introduced into the slider by a hole provided in a web of the slider. Each slider also has locking means that cooperate with the perforations in the steel plate and are actuatable from each hole in the web of the slider.

According to another aspect of the invention, each seat leg is attached to steel shafts that pass through the slider and rest on the wings of the slider, thereby improving the contact area and strength of the device. The rows of perforations are necessary for locking the lengthwise position of the slider relative to the track. The perforations are provided in the steel plate which is able to withstand lengthwise forces independently of the track in the event of an impact. The plate is also able to withstand the lengthwise forces that would deform the web of the track. The vertical tearing forces resulting from such an impact are absorbed by the slider abutting the bent returns of the track. In other words, the tearing forces are absorbed over a very large surface area which prevents the tearing forces from spreading to the wings of the track.

According to yet another aspect of the invention, the locking means that lock the slider into the track has two levers disposed lengthwise in the slider and are articulated with respect to the slider. Each lever has a set of teeth at one end that are able to penetrate the perforations in the plate and a support for the return spring at the other end. The levers are disposed on either side of a control rocker which rests on a cross member connecting the levers. Each end of the rocker has a vertical pusher that is cylindrically shaped. In addition, the rocker is slidably mounted in a corresponding hole in the slider along the path of the manual control supported on a leg of the seat.

According to another aspect of the invention, the configuration of the locking device increases the number of teeth engaging the perforations, thereby increasing the strength of the track cross section. Moreover, the control rocker abuts the cross member connecting the levers enabling the seat to be unlocked, regardless of which pusher is urged. Hence, the device is able to operate whether the manual control means are disposed at the front part or the rear part of the slider. Moreover, each of the pushers can be manually actuated and displace the slider relative to the track.

BRIEF DESCRIPTION OF THE DRAWINGS

FIG. 1 is a longitudinal section view of the device;

FIG. 3 is a cross section of the device of FIG. 1 taken along section line 3—3 showing the means by which the slider is attached to the seat;

FIG. 4 is a cross section of the device of FIG. 1 taken along section line 4—4 showing the means by which the levers are articulated to the slider;

FIG. 5 is partial longitudinal section view of the device in FIG. 1 showing a lever being urged in the unlocking direction by a front finger of a control rocker;

FIG. 6 is a partial longitudinal section view of the device in FIG. 1 showing the lever being urged in the unlocking direction by the rear finger of the control rocker;

FIG. 7 is a cross section of a second embodiment of the invention showing the means by which a slider is attached to the seat;

FIG. 8 is another cross section of the second embodiment of the invention showing the means by which the levers are articulated in the slider; and FIG. 9 is a plan view of the cross section of the device.

DETAILED DESCRIPTION OF PREFERRED EMBODIMENTS

Figure 2:
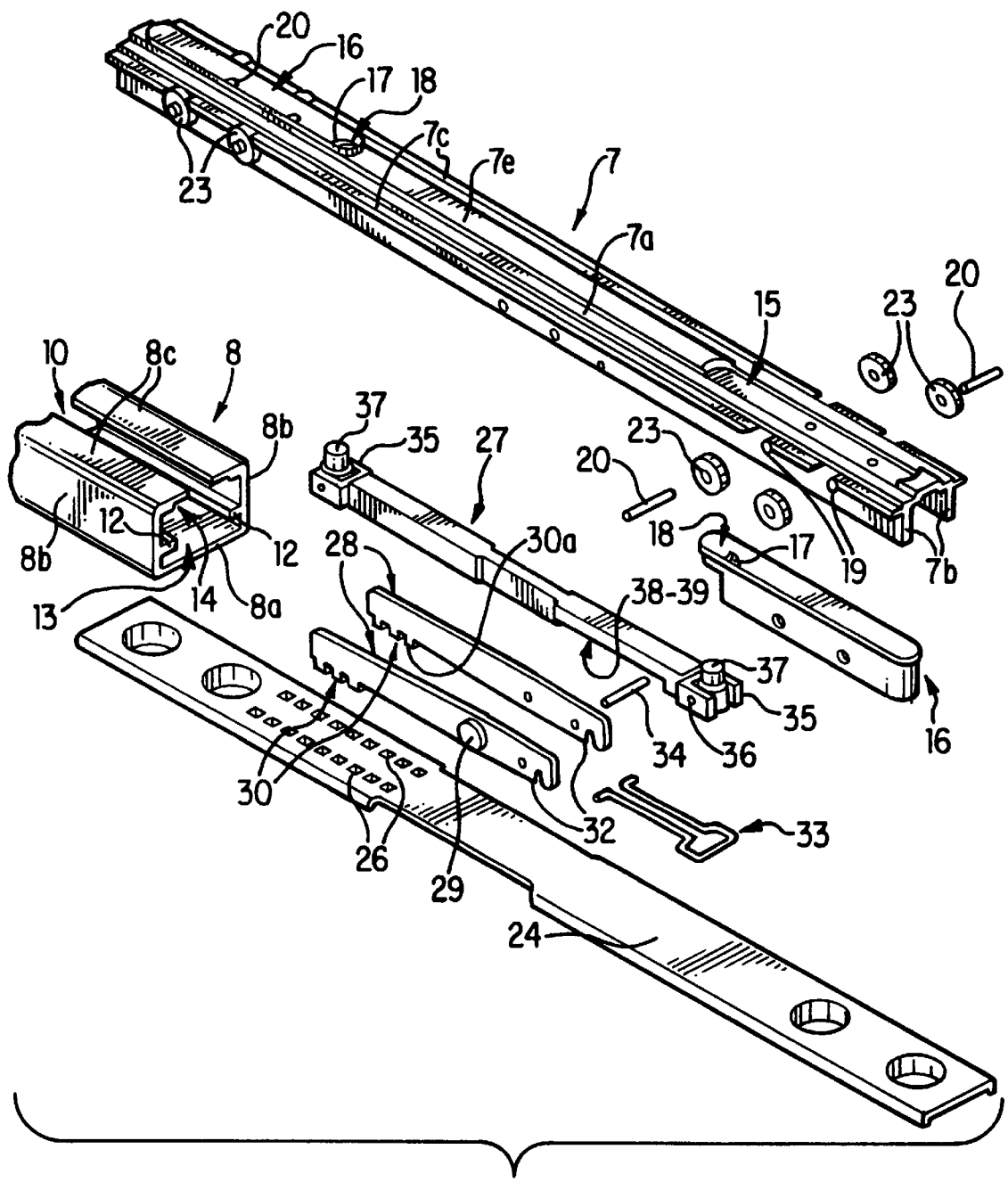
FIG. 2 is an exploded perspective view of the device of FIG. 1.

While the invention will hereafter be described in connection with preferred embodiments thereof, it will be understood that it is not intended to limit the invention to these embodiments. On the contrary, it is intended to cover all alternatives, modifications and equivalents that may be included within the spirit and scope of the invention as defined by the appended claims.

Hereafter, a detailed description of embodiments of the seat securing and adjusting device of this invention is provided with reference to the drawings. In the drawings, like reference numerals have been used throughout to designate like elements.

In FIG. 1, reference number 2 designates the frame of a seat having two front legs 3 and two rear legs 4. Each leg 3 and 4 includes hooking means (not shown) that are actuated by control means (not shown). At its front legs 3, the frame 2 has a manual control having a lever 5 articulated to the frame 2 at a joint 6. The manual control is used to unlock the seat from the fastening device. On each side of the seat frame 2, front leg 3 and rear leg 4 are attached to a slider 7 that is displaceable relative to a track 8 attached to the floor of the vehicle 9.

As shown in FIG. 2, the track 8 has a C-shaped cross section and is made of a light-alloy section, such as, for example, aluminum. The track 8 includes a web 8a, two wings 8b, and two upper bent returns 8c which form a slot 10 between the returns 8c. Two horizontal internal ribs 12 divide the cavity inside the track 8 into a lower compartment 13 and an upper compartment 14.

The slider 7 is also made of a light-alloy section, such as, for example, aluminum. The slider 7 has an inverted U-shaped cross section that includes a web 7a and two wings 7b. The web 7a has fins 7c that extend away from the web 7a in a direction perpendicular to the wings 7b. In addition, the web 7a is pierced lengthwise by oblong holes 15 located near the ends of the slider 7. Each hole 15 is designed to receive a tubular shell 16 that is made of a synthetic material.

Looking at FIG. 3, it can be seen that the shell 16 passes through the slot 10 to form a guide element for the seat legs 3 and 4. Returning to FIG. 2, it can be seen that the shell 16 has a horizontal wall 17 that is traversed by a bore 18, the function of which will be explained below. The wall 17 is located on the end of the shell 16 closer to the other hole 15 in the slider 7.

Each wing 7b of the slider 7 is pierced by spaced bores 19 configured to receive steel shafts 20. The ends of the shafts 20 project beyond the slider 7 and serve as supports for wheels 23 that travel along the internal ribs 12 of the track 8. The central part of each shaft 20, i.e., the part disposed in the shell 16, is designed to hook the fastening means of one of the legs of a seat and, for example, the hooks 31 that are articulated to the leg.

Looking at FIG. 9, it can be seen that a shoe 21 connects the ends of the two shafts 20 projecting beyond the wheels 23. Each shoe 21 is made of a synthetic material and has a central part 21a that provides elastic compensation for the lateral play between the wings 8b of the track 8 and the wings 7b of the slider 7. The shoe 21 also has wings 21b that compensate for the vertical play between the internal ribs 12 and the bent returns 8c of the track 8. In addition, the shoes 21 reduce noise and improve passenger comfort.

Returning to FIG. 3, it can be seen that the slider 7 is completely disposed in the upper compartment 14 of the track 8 and is retained therein by the bent returns 8c. Looking at FIG. 4, it can be seen that the web 7a forms a central rib 7e that provides lengthwise guidance and slides within the slot 10 of the track 8.

The lower compartment 13 of the track 8 serves as an accommodation for a plate 24 which, in the embodiment shown in FIGS. 2–4, has a cross section in the form of an inverted U. Preferably, the plate 24 is made of steel and is connected to the track 8 by rivets 25 (FIG. 1) that attach the track 8 to the floor 9 of the vehicle. The plate 24 is traversed by parallel rows of spaced perforations 26 that are distributed in each row with a constant pitch. It will be noted that the perforations 26 are small in size and have little effect on the strength of the plate 24. The perforations 26 are designed to cooperate with the locking means to ensure that the slider 7 is locked onto the track 8.

Looking at FIG. 2, it can be seen that the locking means include a control rocker 27 bordered by two lengthwise levers 28. As shown in FIG. 4, each lever 28, which is made of, for example, steel, is articulated on a pivot 29. The body of the pivot 29 passes through one of the wings 7b of the slider 7 and the head of the pivot 29 is disposed inside the slider 7 near the rocker 27.

It can also be seen that the fins 7c of the slider 7 are proximate to the inner face of the bent returns 8c of the track 8. However, the fins 7c are not close enough to the returns 8c to rub against the returns 8c, but are close enough to engage the returns 8c in the event a vertical force tries to pull the slider 7 off the track 8. Such a vertical force would be distributed over the length of the slider with the exception of the areas where the fins 7c are cut away to allow the free rotation of the wheels 23.

Each lever 28 is provided with a set of teeth 30 at the font end of the lever 28. The set of teeth 30 are comprised of several teeth 30a that are able to penetrate the perforations 26 in the plate 24. A support 32 for spring means is provided at the rear end of each lever 28. The support 32 is comprised of, for example, a spring pin 33. In front of the support 32, the levers 28 are connected by a cross member 34 such as, a pin, for example.

The control rocker 27 is made of a synthetic material. At each end of the rocker 27, a fork joint 35 is traversed by a horizontal and transverse shaft 36 on which the lower part of a cylindrical pusher 37 is articulated. The pusher 37 projects vertically upward from the shaft 36. In the rear part of the rocker 27, a lower recess 38 delimits a contact surface 39 by which the rocker 27 rests on the cross member 34 connecting the levers 28.

In the normal position shown in FIG. 1, the spring pin 33 subjects the levers 28 to a rocking torque that forces the teeth 30a to penetrate the perforations 26 in the plate 24. Thus, the slider 7 is immobilized as well as the seat with respect to the track 8. It will be noted that in this position, the two vertical pushers 37 that slide freely in the bores 18 of the shells 16 are flush with the upper plane of the shells 16. FIG. 1 shows that at least one of the pushers 37 is disposed in the path of the manual control. The manual control includes a finger 40 that is mounted on the lever 5.

For the lengthwise adjustment of a seat facing forward, the operator must pivot the lever 5 in the direction of arrow 41 (FIG. 1) so that the finger 40 comes in contact with the front pusher 37a (FIG. 5) and moves the finger 40 in the direction of arrow 42. When this movement takes place, the rocker 27 first pivots around the cross member 34 until the shoulder of the rear pusher 37b abuts the wall 17 of the shell 16. Following this contact, the rocker 27 pivots around the shaft 36 of the rear pusher 37b causing the cross member 34 to descend. As a consequence, the two levers 28 are pivoted in the direction of arrow 43 and their teeth 30a are pulled out of the perforations 26 in the plate 24, thus unlocking the slider 7 from the plate 24.

When the seat has been moved to its desired position, releasing lever 5 enables the spring pin 33 to tilt the levers 28 in the opposite direction so that their teeth 30a re-engage the perforations 26. Simultaneously, by means of the cross member 34, the rocker 27 is realigned and the pushers 37a and 37b are returned to their resting position. FIG. 6 shows that the rocker 27 performs the same unlocking function when the seat faces backward and the control lever 5 is located toward the rear and, by means of its finger 40, abuts the rear pusher 37b.

From the foregoing discussion regarding a first embodiment of the seat security and adjusting device, it can be seen that the device provides a very strong leg-slider connection because it uses two steel shafts having large cross sections. The device also provides very good resistance to tearing free vertically because the fins 7c of the slider 7 abut the bent returns 8c of the track 8. Also, the device provides excellent resistance to tearing free in the lengthwise direction due to the engagement of several teeth 30a in the small cross-section perforations 26 in the plate 24. The connection between the track 8 and the floor is reinforced by interposing the plate 24 therebetween.

Furthermore, the configuration of the device facilitates the lengthwise adjustment of the seat by reducing friction due to the use of the wheels 23. The structure of the device also reduces the weight of the device as a whole by using aluminum alloy for the slider 7 and the track 8 and synthetic material for the tubular shell 16, the support wheels 23, and the rocker 27. In addition, the parts are not under any undue stress. The configuration of the device also allows the unlocking device to be reversed without a complex mechanism and allows the manual actuation of the tracks 8 simply by pressing the finger 40 of the manual control on either of the vertical unlocking control pushers 37a and 37b.

Looking at another embodiment of the invention as shown in FIG. 7, it can be seen that the device can be used in a double track 108 which, side by side with the single track 8, allows seats with two kinds of footprints to be accommodated. In this embodiment, the track 108 is enlarged and the slider 107 has a central wing 107d which gives the double track 108 an E-shaped cross section. The wing 107d is extended downward below the side wings 107b to form a hook 50 capable of cooperating with an additional hook 52 that is integral with the plate 124. The hook 52 is disposed in a recess 53 provided in the middle of the plate 124 having spaced lengthwise areas 54 provided with a row of perforations 26 therein.

This embodiment uses levers 128 that are identical to the levers 28 in the previous embodiment and attached on the wings 107b in a similar manner, as shown in FIG. 8. The rocker 127 has two branches 127a and 127b disposed on either side of the central wing 107d which, as shown in FIG. 9, are connected at their ends and shaped to form two fork joints 135 on which a pusher 137 is articulated.

By means of this arrangement, the rocker 127 can still be actuated in the unlocking direction whatever the footprint of the seat and, more specifically, whatever the transverse position of the unlocking lever 5 since, whether the seat is wide or narrow, its control lever 5 still meets a vertical pusher 37 that can cause rocking. In addition, FIG. 9 shows that the shafts 120 are longer but are reinforced by their passage through the central wing 107d.

Due to the presence of the wing 107d with its hook 50 cooperating with the hook 52 of the plate 124, this device is just as resistant to tearing free vertically upward as the previous embodiment of the device described above.

What is claimed is:

1. A device for securing and adjusting the lengthwise position of a removable and reversible seat having a frame with front and rear legs, the seat being secured to a floor of a vehicle, comprising:

at least two parallel tracks adapted to be secured to the floor of the vehicle, each track having a C-shaped cross section and an internal cavity divided into an upper compartment and a lower compartment by horizontal internal ribs;

at least two sliders, each slider having an inverted U-shaped cross section and is disposed in the upper compartment of the track, each slider is movable with respect to the track and supports a first fastening means that cooperates with a second fastening means adapted to be provided on each leg of the seat;

a plate having parallel rows of perforations spaced lengthwise relative to the plate, the plate being disposed in the lower compartment of the track;

locking means provided in the slider, the locking means cooperating with the perforations in the plate to lock the slider in the track and is releasingly engageable from elongated apertures in a web of the slider through which each leg is introduced into the slider, the locking means also cooperates with fixed recesses in the track and can be brought into an unlocked position against a spring return means by a manual control adapted to be mounted on the frame of each seat; and each end of the slider is horizontally traversed by shafts having a central part and shaft ends, the central part providing hooking elements for complimentary means with which each leg is equipped and the shaft ends support wheels that travel along the internal ribs of the track.

2. The device according to claim 1, further comprising:

a control rocker having a fork joint at each end of the control rocker, each fork joint having a cylindrical pusher extending vertically away from the control rocker and disposed in a path of the manual control mounted on the frame of each seat; and the locking means include at least two levers disposed lengthwise within the slider, the levers are articulated with respect to the slider, each slider having a set of teeth at one end, the teeth designed to engage the perforations in the plate, and a support for the spring return means at another end, the levers being disposed on both sides of the control rocker which rests on a cross member that connects the two levers.

3. The device according to claim 2, further comprising:

a tubular shell engaged in each of the elongated apertures of the web of the slider, the tubular shell having a horizontal interior wall at an inside end traversed by a bore that guides an end of the cylindrical pusher and forms a stop for a shoulder of the cylindrical pusher, each shell receiving one seat leg.

4. The device according to claim 3, further comprising:

a horizontal transverse shaft in the fork joint at each end of the rocker, each control pusher being articulated around the horizontal transverse shaft.

5. The device according to claim 4, wherein the web of the slider is provided with a central rib that is slidably mounted in a slot of the track, the central rib is bordered by side wings that are able to rest on bent returns of the track to resist the device from being torn from the floor of the vehicle by a force without contacting the bent returns.

6. The device according to claim 1, further comprising:

a shoe that connects ends of shafts disposed on a same side of the slider, the shoe having a central part that elastically compensates for lateral play and shoe wings that compensate for vertical play between the track and the slider.

7. The device according to claim 1, wherein the manual control is adapted to be mounted on a front leg of the seat.

8. The device according to claim 1, wherein the manual control is adapted to be mounted on a rear leg of the seat.

* * * * *